US009501960B2

(12) United States Patent
Park et al.

(10) Patent No.: US 9,501,960 B2
(45) Date of Patent: Nov. 22, 2016

(54) DISPLAY PANEL (71) Applicant: Samsung Display Co., Ltd., Gyeonggi-do (KR)

(72) Inventors: Min Wook Park, Chungcheongnam-do (KR); Jung-Deok Seo, Chungcheongnam-do (KR); Dong Hee Ye, Daegu (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 186 days.

(21) Appl. No.: 13/749,183

(22) Filed: Jan. 24, 2013

(65) Prior Publication Data

US 2014/0078123 A1　Mar. 20, 2014

(30) Foreign Application Priority Data

Sep. 19, 2012 (KR) .................... 10-2012-0104071

(51) Int. Cl.
*G09G 3/20*　(2006.01)
*G09G 3/36*　(2006.01)
*G02F 1/1333*　(2006.01)
*G02F 1/1345*　(2006.01)

(52) U.S. Cl.
CPC ............ *G09G 3/20* (2013.01); *G02F 1/13454* (2013.01); *G02F 2001/13456* (2013.01); *G02F 2001/133388* (2013.01); *G09G 3/3607* (2013.01); *G09G 3/3648* (2013.01); *G09G 3/3677* (2013.01); *G09G 3/3688* (2013.01); *G09G 2300/0408* (2013.01); *G09G 2300/0426* (2013.01); *G09G 2310/0221* (2013.01)

(58) Field of Classification Search
CPC ................................ G02F 1/3334; G09G 3/20
USPC ....................... 345/204, 205, 690, 87; 349/56
See application file for complete search history.

(56) References Cited

U.S. PATENT DOCUMENTS

| 6,005,645 | A | * | 12/1999 | Hirakata | ............ | H04N 13/0497 |
| | | | | | | 348/E13.029 |
| 7,710,525 | B2 | | 5/2010 | Sohn | | |
| 2002/0080302 | A1 | | 6/2002 | Dubin et al. | | |
| 2003/0231144 | A1 | | 12/2003 | Cho et al. | | |
| 2005/0285811 | A1 | * | 12/2005 | Kawase | ............. | G02F 1/13336 |
| | | | | | | 345/1.1 |
| 2006/0145977 | A1 | * | 7/2006 | Lee | ...................... | G09G 3/3648 |
| | | | | | | 345/87 |
| 2006/0238450 | A1 | * | 10/2006 | Onodera | ............... | G02F 1/1309 |
| | | | | | | 345/60 |
| 2006/0238463 | A1 | | 10/2006 | Kim et al. | | |
| 2008/0164056 | A1 | * | 7/2008 | Gettemy | ................ | H05K 1/147 |
| | | | | | | 174/260 |

(Continued)

FOREIGN PATENT DOCUMENTS

| JP | 2001-216090 | 8/2001 |
| JP | 2003-157031 | 5/2003 |

(Continued)

*Primary Examiner* — Grant Sitta
(74) *Attorney, Agent, or Firm* — F. Chau & Associates, LLC (57) ABSTRACT

A display panel includes a plurality of pixels positioned in the display area, a pixel driver connected with two or more of the plurality of pixels and configured to drive the connected pixels, and a plurality of signal lines configured to transfer signals to the pixel driver, in which at least one of the plurality of signal lines overlaps the pixel driver.

6 Claims, 10 Drawing Sheets

(56) References Cited

U.S. PATENT DOCUMENTS

| | | | |
|---|---|---|---|
| 2009/0073360 A1* | 3/2009 | Jeon | G01J 1/44 349/116 |
| 2010/0045918 A1* | 2/2010 | Han et al. | 349/149 |
| 2010/0053517 A1* | 3/2010 | Imai | G02F 1/133555 349/113 |
| 2010/0244025 A1 | 9/2010 | Liou | |
| 2010/0302717 A1 | 12/2010 | Oh et al. | |
| 2010/0309100 A1* | 12/2010 | Cok | G09G 3/2085 345/76 |
| 2011/0080088 A1 | 4/2011 | Hara et al. | |
| 2011/0279418 A1 | 11/2011 | Han et al. | |
| 2012/0113069 A1* | 5/2012 | Kwon | 345/204 |
| 2012/0194773 A1* | 8/2012 | Kim et al. | 349/139 |
| 2013/0050157 A1* | 2/2013 | Baek | G09G 3/2022 345/204 |

FOREIGN PATENT DOCUMENTS

| | | |
|---|---|---|
| JP | 2004-247373 | 9/2004 |
| JP | 3845762 | 9/2006 |
| JP | 4188188 | 9/2008 |
| JP | 2009-244587 | 10/2009 |
| JP | 2011-013415 | 1/2011 |
| JP | 2011-100742 | 5/2011 |
| JP | 2011-175612 | 9/2011 |
| JP | 4845749 | 10/2011 |
| KR | 1997-0017835 | 4/1997 |
| KR | 10-1998-058371 | 9/1998 |
| KR | 10-0465025 | 12/2004 |
| KR | 10-2005-0000447 | 1/2005 |
| KR | 10-2006-0087726 | 8/2006 |
| KR | 10-2007-0005274 | 1/2007 |
| KR | 10-2009-0090493 | 8/2009 |
| KR | 10-2009-0100949 | 9/2009 |
| KR | 10-2009-0102215 | 9/2009 |
| KR | 10-0930272 | 11/2009 |
| KR | 10-2010-0018722 | 2/2010 |
| KR | 10-0950228 | 3/2010 |
| KR | 10-0976581 | 11/2010 |
| KR | 10-1014730 | 2/2011 |
| KR | 10-2011-0114906 | 10/2011 |
| KR | 10-2012-0088971 | 8/2012 |

* cited by examiner

DISPLAY PANEL

CROSS-REFERENCE TO RELATED APPLICATION

This application claims priority under 35 U.S.C. §119 to Korean Patent Application No. 10-2012-0104071 filed in the Korean Intellectual Property Office on Sep. 19, 2012, the disclosure of which is incorporated by reference herein in its entirety.

TECHNICAL FIELD

Embodiments of the present invention relate to a display panel.

DISCUSSION OF THE RELATED ART

A display device, such as a liquid crystal display, an organic light emitting diode display, a plasma display, or an electrophoretic display, generally includes a display panel and a driver for driving the display panel.

To reduce manufacturing costs, a part of the driver may be integrated with the display panel. For example, a gate driver for generating a scan signal or a data driver for transferring a data signal may be integrated with the display panel.

A display panel may include a display area for displaying images and a bezel surrounding the display area. However, when the size of the bezel is increased, the display area may appear small.

SUMMARY

An exemplary embodiment of the present invention provides a display panel includes a plurality of pixels positioned in a display area a pixel driver connected with two or more of the plurality of pixels and configured to drive the connected pixels, and a plurality of signal lines configured to transfer signals to the pixel driver, in which at least one of the plurality of signal lines overlaps the pixel driver.

The display panel according to the exemplary embodiment of the present invention may further include an insulating layer formed between the plurality of signal lines and the pixel driver, in which the plurality of signal lines may be formed on or below the pixel driver.

At least a part of the pixel driver may be positioned in the display area.

The pixel driver may include a first portion positioned in a non-display area and a second portion connected with the first portion and disposed between the pixels in the display area, and the plurality of signal lines may be overlapped with the first portion of the pixel driver.

At least one of the pixels may include a switching unit connected with the pixel driver and turning on and off according to a signal from the pixel driver, and a display unit connected with the switching unit and displaying an image. At least a part of the switching unit of the pixel and at least a part of the pixel driver may be formed from the same thin film.

The plurality of signal lines may include a low voltage signal line, a clock signal line, and a scan starting signal line.

An exemplary embodiment of the present invention provides a display panel includes a plurality of pixels positioned in a display area, a pixel driver connected with two or more of the plurality of pixels and configured to drive the connected pixels, and a plurality of signal lines configured to transfer signals to the pixel driver, in which at least one of the plurality of signal lines is formed in the display area.

The plurality of signal lines are spaced apart from each other.

The plurality of pixels may be formed in pixel rows and pixel columns, and the plurality of signal lines may be formed along the pixel columns.

The plurality of signal lines may overlap at least some of the pixel columns.

A horizontal length of at least one of the plurality of pixels may be larger than a vertical length of the at least one pixel.

The plurality of pixels positioned in the same pixel column of the pixel columns may represent at least two colors.

The pixel driver may be formed in a non-display area.

At least a part of the pixel driver may be positioned in the display area.

An exemplary embodiment of the present invention provides a display panel including a plurality of sub-display areas, a non-display area, a light blocking area positioned between the sub-display areas, a plurality of pixels positioned in the sub-display areas, a pixel driver connected with two or more of the plurality of pixels and configured to drive the connected pixels, and a connection line connecting at least one of the pixels with the pixel driver, in which the pixel driver or the connection line is formed in the light blocking area.

A width of the light blocking area may be about two times larger than a width of the non-display area.

A width of the light blocking area may be larger than a width of one of the pixels.

The light blocking area may be positioned at the center of the display area, and the plurality of sub-display areas may include a first sub-display area positioned at the first side of the light blocking area and a second sub-display area positioned at the second side of the light blocking area.

At least one of the pixels may include a switching unit connected with the pixel driver and turning on and off according to a signal from the pixel driver, and a display unit connected with the switching unit and displaying an image, and at least a part of the switching unit and at least a part of the pixel driver may be formed of the same thin film, and the pixel driver may be formed in the light blocking area.

The display panel may further include gate lines formed in a first direction in the display area and connected with the pixels, in which the connection line may be connected with at least two of the gate lines, and the connection line may be formed in the light blocking area.

According to an exemplary embodiment of the present invention, there is provided a display panel including a plurality of pixels disposed in an image display area of the display panel, a pixel driver connected with the plurality of pixels, and a signal line connected to the pixel driver and the plurality of pixels. The signal line fully or partially overlaps the plurality of pixels.

Part of the pixel driver may be formed in the image display area, and another part of the pixel driver may be formed in a non-image display area of the display panel.

DETAILED DESCRIPTION OF EXEMPLARY EMBODIMENTS

Exemplary embodiments of the present invention will be described in more detail hereinafter with reference to the accompanying drawings. As those skilled in the art would realize, the described embodiments may be modified in various different ways.

Like reference numerals may designate like or similar elements throughout the specification and the drawings. It will be understood that when an element is referred to as being "on," "connected to," or "coupled to" another element, it can be directly on, connected to or coupled to the other element or intervening elements may be present.

As used herein, the singular forms "a," "an," and "the" are intended to include the plural forms as well, unless the context clearly indicates otherwise.

Figure 1:
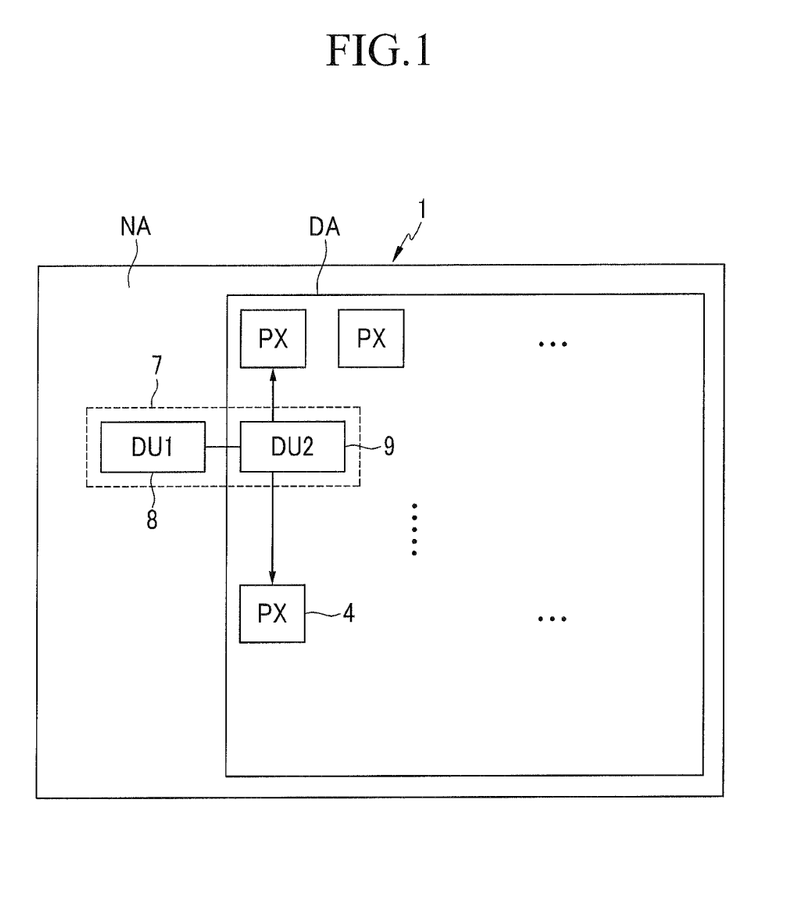
FIG. 1 is a block diagram illustrating a display panel according to an exemplary embodiment of the present invention.
Figure 2:
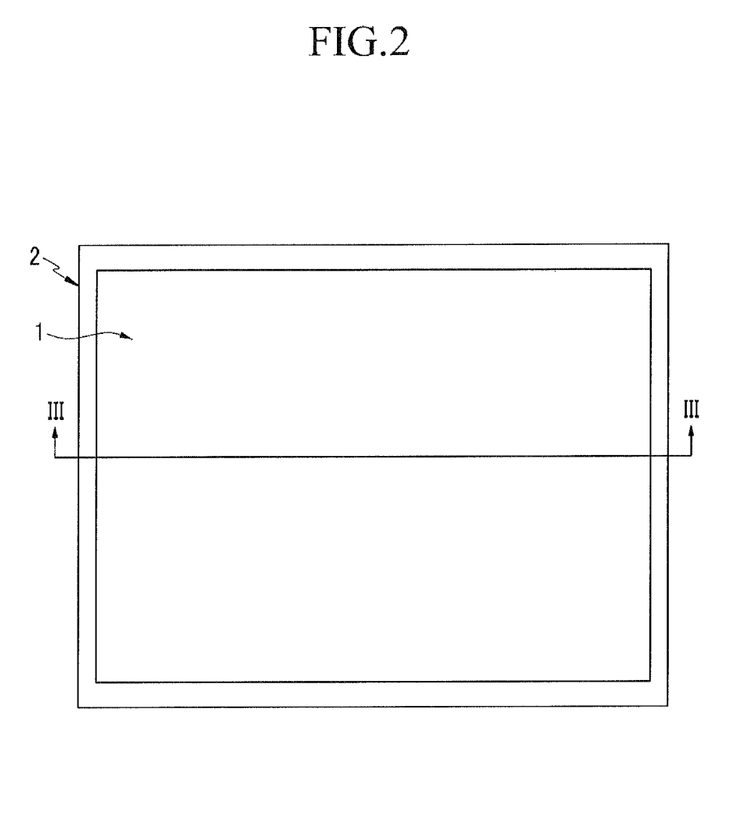
FIG. 2 is a plan view illustrating an example of a flat panel display including the display panel of FIG. 1.
Figure 3:
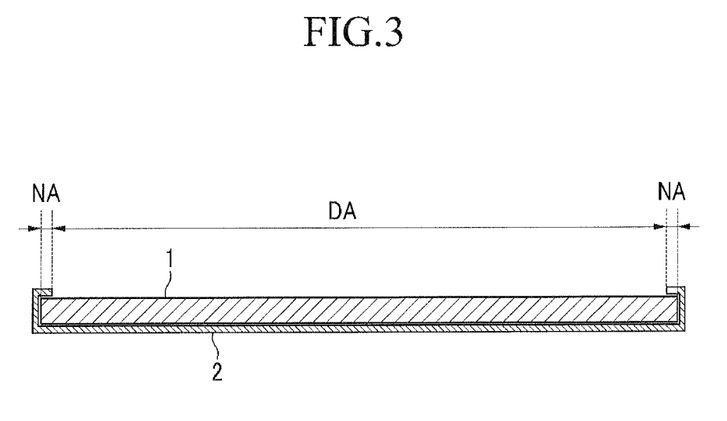
FIG. 3 is a cross-sectional view illustrating the display device of FIG. 2 taken along line III-III.
Figure 4:
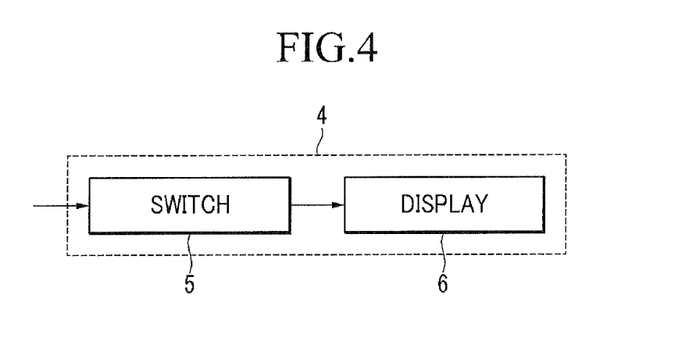
FIG. 4 is a block diagram illustrating a pixel of a display panel according to an exemplary embodiment of the present invention.

FIG. 1 is a block diagram illustrating a display panel according to an exemplary embodiment of the present invention, FIG. 2 is a plan view illustrating an example of a flat panel display including the display panel of FIG. 1, FIG. 3 is a cross-sectional view illustrating the display device of FIG. 2 taken along line and FIG. 4 is a block diagram illustrating a pixel of a display panel according to an exemplary embodiment of the present invention.

A display panel 1 according to an exemplary embodiment of the present invention includes a plurality of pixels 4 and a pixel driver 7 for driving the plurality of pixels as illustrated in FIG. 1. The display panel 1 may be a part of a flat panel display (FPD), such as a liquid crystal display (LCD), an organic light emitting display (OLED), and an electrowetting display (EWD).

Referring to FIGS. 1 to 3, the display panel 1 includes a display area DA for displaying an image and a non-display area NA other than the display area DA. The display area DA may include the center of the display panel 1. An image may be displayed in the display area DA. The non-display area NA, as shown in FIGS. 2 and 3, may be covered by a bezel 2. The non-display area NA may be positioned at an edge of the display panel 1 surrounding the display area DA, and accordingly, is referred to as a peripheral area. The display area 2 may be substantially rectangular, but is not limited thereto.

FIG. 1 illustrates one display area DA, but the embodiments of the present invention are not limited thereto. The display area DA may be divided into a plurality of sub-regions, and the non-display area NA may be positioned between the plurality of sub-regions of the display area DA. Such configuration may be The pixels 4 are positioned in the display area DA, and may have, e.g., a row and column arrangement, but are not limited thereto. Referring to FIG. 4, a pixel 4 may include a switching unit 5 electrically connected with the pixel driver 7 and a display unit 6 connected to the switching unit 5. The switching unit 5 may be turned on or off according to a signal from the pixel driver 7 or may selectively transfer a signal from the pixel driver 7. The switching unit 5 may include at least one switching element. The display unit 6 may display an image according to a signal provided from the switching unit 5.

The pixel driver 7 is electrically connected with one or more pixels 4 and may transfer a signal from the outside to the pixels 4 or may generate a signal based on a signal from the outside and may apply the generated signal to the pixel 4. The pixel driver 7 may include a first portion DU1 (8) positioned in the non-display area NA and a second portion DU2 (9) positioned in the display area DA. The first portion 8 and the second portion 9 are electrically connected to each other, and the first portion 8 or the second portion 9 may be electrically connected to a pixel 4. The second portion 9 may be disposed between the pixels 4.

The pixel driver 7 may include at least one active element, for example, a transistor or a diode. According to an exemplary embodiment of the present invention, each of the first portion 8 and the second portion 9 may include at least one active element. According to an exemplary embodiment of the present invention, one active element may be included in the first portion 8 and the second portion 9. In other words, a part of one active element of the pixel driver 7 may be positioned in the display area DA, and the rest of the active element may be positioned in the non-display area NA. According to an exemplary embodiment of the present invention, the second portion 9 may include at least one passive element, for example, a capacitor.

As shown in FIG. 1, the first portion 8 of the pixel driver 7 is positioned at the left side of the display area DA, but is not limited thereto. For example, the first portion 8 of the pixel driver 7 may be positioned at any one of the right side, the upper side, and the lower side of the display area DA. The first portion 8 of the pixel driver 7 may be disposed at two or more positions of upper, lower, left, and right sides of the display area DA.

According to an exemplary embodiment of the present invention, the pixel 4 and the pixel driver 7 may include at least one thin film. For example, the switching unit 5 of the pixel 4 includes a thin film transistor, and the second portion 9 of the pixel driver 7 may include a thin film transistor. According to an exemplary embodiment of the present invention, the thin film transistor of the pixel 4 and the thin film transistor of the pixel driver 7 may be made in the same or substantially the same manufacturing process. For example, the thin film transistor of the pixel 4 and the thin film transistor of the pixel driver 7 each may include portions formed by patterning one thin film or two or more thin films. For example, an electrode of the thin film transistor of the pixel 4 and an electrode of the thin film transistor of the pixel driver 7 may be formed of at least one conductive layer.

According to an exemplary embodiment of the present invention, at least a part of the pixel driver 7 may be positioned not in the display panel 1 but on the surface of the display panel 1.

According to an exemplary embodiment of the present invention, the entire pixel driver 7 may be disposed in the display area DA or in the non-display area NA.

As the second portion 9 of the pixel driver 7 is formed in the display area DA, the size of pixels PX adjacent to the second portion 9 may be smaller than the size of other pixels PX not adjacent to the second portion 9. However, the embodiments of the present invention are not limited thereto, and for example, all of the pixels PX may have the same size.

As such, when at least a part of the pixel driver 7 is disposed in the display area DA, the non-display area NA may be reduced. Further, the size of the display panel 1 may be reduced.

Figure 5:
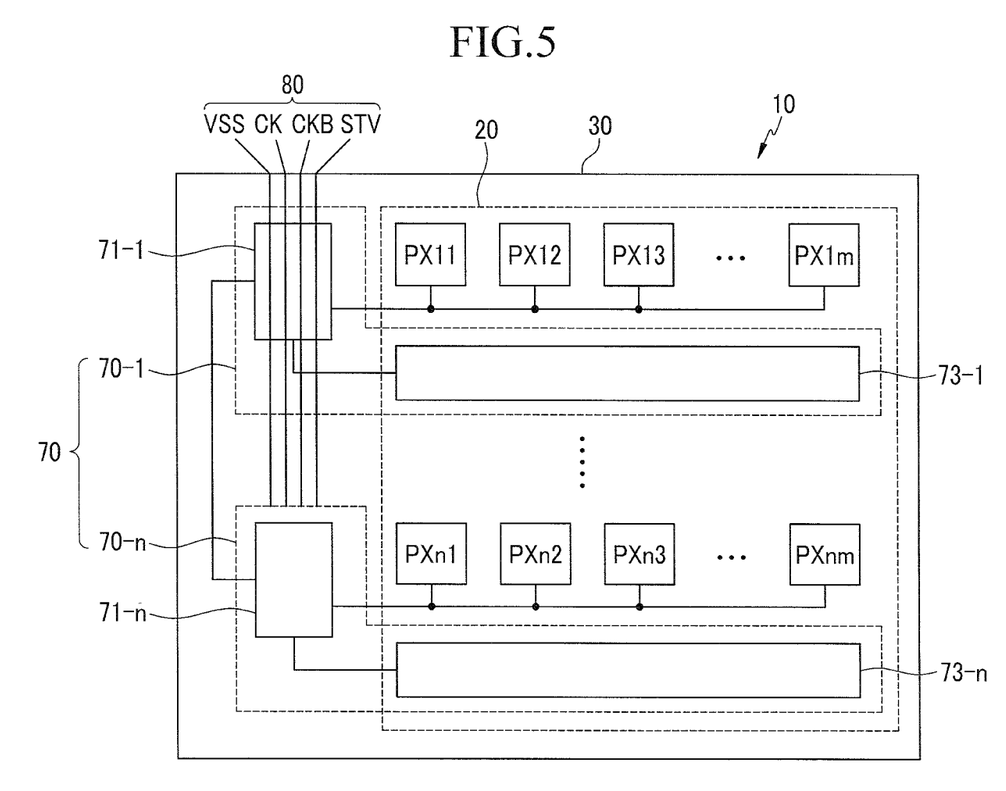
FIG. 5 is a block diagram illustrating a display panel according to an exemplary embodiment of the present invention.

Referring to FIG. 5, a display panel according to an exemplary embodiment of the present invention is described in more detail.

FIG. 5 is a block diagram illustrating a display panel according to an exemplary embodiment of the present invention.

As illustrated in FIG. 5, the display panel 10 according to an exemplary embodiment of the present invention includes a plurality of pixels PX11, PX12, PX13, . . . , PXnm for displaying images, a pixel driver 70 for driving the plurality of pixels, and a plurality of signal lines 80 through which signals are transferred to the pixel driver 70.

The display panel 10 includes a display area 20 and a non-display area 30. Images are displayed from the display area 20, but not from the non-display area 30. The non-display area 30 may be positioned, for example, around the display area 20 and may be covered by a bezel. The non-display area 30 may surround the display area 20 or be positioned at an edge of the display panel 10.

The pixels PX11, PX12, PX13, . . . , PXnm are positioned in the display area 20, and a part of the pixel driver 70 is positioned in the non-display area 30 and the rest of the pixel driver 70 is positioned in the display area 20. The pixel driver 70 may generate or transfer one or more electrical signals to be applied to the pixels PX11, PX12, PX13, . . . , PXnm, for example, gate signals or data signals. The pixels PX11, PX12, PX13, . . . , PXnm may receive signals from the pixel driver 70 and display images or data.

The pixels PX11, PX12, PX13, . . . , PXnm may be arranged in a row and column form. Referring to FIG. 5, for example, m pixels PX11, PX12, PX13, . . . , PX1m may be disposed in a first row, and m pixels PXn1, PXn2, PXn3, . . . , PXnm may be disposed in an n-th row.

The pixel driver 70 includes a plurality of stages 70-1, . . . , 70-n.

The stages 70-1, . . . , 70-n (n is a natural number) may be electrically connected with their respective adjacent stages. According to an exemplary embodiment of the present invention, the stages 70-1, . . . , 70-n may be connected with their respective nearest stages. According to an exemplary embodiment of the present invention, the stages 70-1, . . . , 70-n may be electrically connected with stages spaced apart by one or more stages from the stages 70-1, . . . , 70-n, respectively. For example, the stages 70-1, . . . , 70-n may be electrically connected with their respective second nearest stages. For example, a k-th [3≤k≤n−2] stage may be connected with a k−2-th stage and a k+2-th stage. However, the connection relationship between the stages 70-1, . . . , 70-n is not limited thereto.

The first stage 70-1 and the last stage 70-n may be connected to each other.

The stages 70-1, . . . , 70-n, respectively, include first sub-stages 71-1, . . . , 71-n positioned in the non-display area 30 and second sub-stages 73-1, . . . , 73-n positioned in the display area 20. The first sub-stages 71-1, . . . , 71-n and the second sub-stages 73-1, . . . , 73-n are electrically connected to each other.

The stages 70-1, . . . , 70-n are directly connected to a plurality of pixels PX11, PX12, PX13, . . . , PX1m, . . . , PXn1, PXn2, PXn3, . . . , PXnm.

According to an exemplary embodiment of the present invention, the stages 70-1, . . . , 70-n may be arranged in a vertical direction or column direction. Each of the stages 70-1, . . . , 70-n may correspond to and connect to a row of pixels PX11, PX12, PX13, . . . , PX1m. For example, the stage 70-1 may correspond to and be connected to a row of the pixels PX11, PX12, PX13, . . . , PX1m. The respective second sub-stages 73-1, . . . , 73-n of the stages 70-1, . . . , 70-n may extend in a horizontal direction along their respective corresponding pixel rows and may be positioned below the corresponding pixel rows, respectively. However, such arrangement of the second sub-stages is not limited thereto. For example, at least one of the second sub-stages 73-1, . . . , 73-n may be positioned above its corresponding pixel row.

According to an exemplary embodiment of the present invention, the stages 70-1, . . . , 70-n may be arranged in a horizontal direction or row direction, and each of the stages 70-1, . . . , 70-n may correspond to a column of pixels PX11, PX21, PX31, . . . , PXn1. Each of the stages 70-1, . . . , 70-n may be connected with a corresponding column of the pixels PX11, PX21, PX31, . . . , PXn1.

According to an exemplary embodiment of the present invention, each of the pixels PX11, PX12, PX13, . . . , PX1m may include the switching unit 5 and the display unit 6 as illustrated in FIG. 4. The switching unit 5 may include at least one switching element, for example, a thin film transistor. The thin film transistor may include a gate, a source, and a drain.

According to an exemplary embodiment of the present invention, each of the sub-stages 71-1, . . . , 71-n, and 73-1, . . . , 73-n of the pixel driver 70 may include at least one thin film transistor. The thin film transistor of the pixel driver 70 and the thin film transistors of the pixels PX11, PX12, PX13, . . . , PX1m may be formed of common thin films.

According to an exemplary embodiment of the present invention, the pixel driver 70 may be a gate driver for supplying gate signals to the gates of the thin film transistors of the pixels PX11, PX12, PX13, . . . , PX1m. According to an exemplary embodiment of the present invention, the pixel driver 70 may be a data driver for supplying data signals to the sources or drains of the thin film transistors of the pixels PX11, PX12, PX13, . . . , PX1m.

The signal lines 80 receive various signals, for example, a low voltage VSS, clock signals CK and CKB, and a scan starting signal STV from the outside and transfer the received signals to the pixel driver 70. The signal lines 80 may be formed in a column direction in the non-display area 30. Some of the signal lines 80, however, may be formed in a row direction in the non-display area 30.

At least one of the plurality of signal lines 80 overlaps the pixel driver 70

In other words, all or some of the signal lines 80 may overlap the pixel driver 70. For example, the signal line 80 transferring the low voltage VSS and the signal line 80 transferring the clock signals CK and CKB overlap the pixel driver 70, and the signal line 80 transferring the scan starting signal STV does not overlap the pixel driver 70.

The signal lines 80 may overlap the first sub-stages 71-1, . . . , 71-*n* disposed in the column direction. When the part of the pixel driver 70 is formed in the non-display area 30 and the rest of the pixel driver 70 is formed in the display area 20, the signal lines 80 overlap the part formed in the non-display area 30. When the part of the pixel driver 70 formed in the non-display area 30 is disposed in a row direction, the signal lines 80 may be disposed in the row direction. When the entire pixel driver 70 is formed in the non-display area 30, the signal lines 80 may overlap a part of the pixel driver 70.

Figure 6:
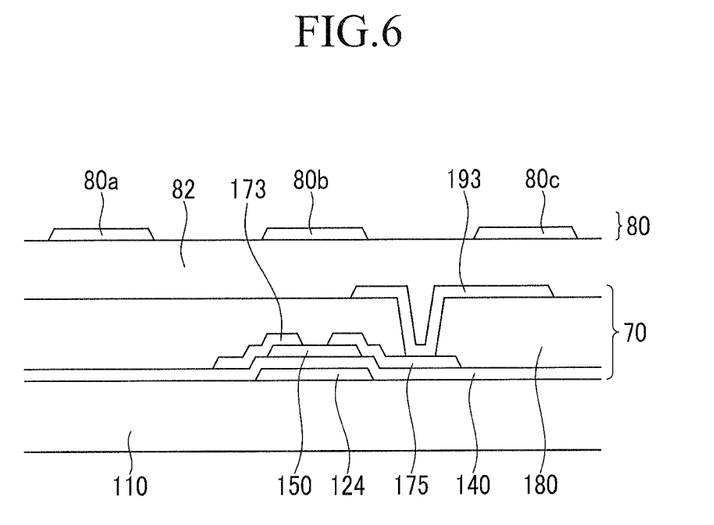
FIGS. 6 and 7 are cross-sectional views illustrating a part of a non-display area of a display panel according to exemplary embodiments of the present invention.
Figure 7:
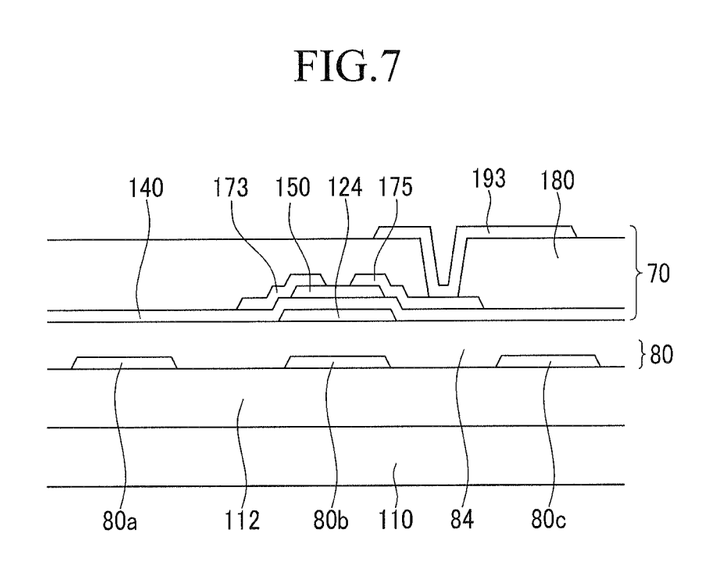

FIGS. 6 and 7 are cross-sectional views illustrating a part of a non-display area of a display panel according to an exemplary embodiment of the present invention.

As illustrated in FIG. 6, signal lines 80 may be formed on a pixel driver 70.

A gate electrode 124 is formed on a substrate 110, a gate insulating layer 140 is formed on the gate electrode 124, and a semiconductor 150 is formed on the gate insulating layer 140 to correspond to the gate electrode 124. A source electrode 173 and a drain electrode 175 are separated from each other and are formed on the semiconductor 150, and a passivation layer 180 is formed on the source electrode 173 and the drain electrode 175. A connection electrode 193 is formed on the passivation layer 180 and is connected with the drain electrode 175.

An insulating layer 82 is formed on the passivation layer 180 and the connection electrode 193, and the plurality of signal lines 80 are formed on the insulating layer 82. The plurality of signal lines 80 include a first signal line 80*a*, a second signal line 80*b*, and a third signal line 80*c*. A low voltage VSS is transmitted through the first signal line 80*a*, and clock signals CK and CKB are transmitted through the second and third signal lines 80*b* and 80*c*.

The pixel driver 70 includes a thin film transistor including the gate electrode 124, the source electrode 173 and the drain electrode 175. The signal line 80 may be formed on the pixel driver 70. To prevent a short circuit between the pixel driver 70 and the signal lines 80, the insulating layer 82 is formed between the pixel driver 70 and the signal lines 80.

A contact hole may be formed through the insulating layer 82. The signal lines 80 and the pixel driver 70 may be connected to each other though the contact hole, and the pixel driver 70 may receive signals from the signal line 80.

As illustrated in FIG. 7, signal lines 80 may be formed below a pixel driver 70.

A buffer layer 112 is formed on a substrate 110, and a plurality of signal lines 80 is formed on the buffer layer 112. The plurality of signal lines 80 include a first signal line 80*a*, a second signal line 80*b*, and a third signal line 80*c*. A low voltage VSS is transmitted through the first signal line 80*a*, and clock signals CK and CKB may be transmitted through the second and third signal lines 80*b* and 80*c*.

An insulating layer 84 is formed on the signal lines 80, a gate electrode 124 is formed on the insulating layer 84, a gate insulating layer 140 is formed on the gate electrode 124, and a semiconductor 150 is formed on the gate insulating layer 140 to correspond to the gate electrode 124. A source electrode 173 and a drain electrode 175 are separated from each other on the semiconductor 150, and a passivation layer 180 is formed on the source electrode 173 and the drain electrode 175. A connection electrode 193 is formed on the passivation layer 180 and is connected with the drain electrode 175.

The pixel driver 70 includes a thin film transistor including the gate electrode 124, the source electrode 173 and the drain electrode 175, and the signal lines 80 may be formed below the pixel driver 70. To prevent a short circuit between the pixel driver 70 and the signal lines 80, the insulating layer 84 is formed between the pixel driver 70 and the signal lines 80.

A contact hole may be formed through the insulating layer 84 and the signal line 80 and the pixel driver 70 may be connected to each other through the contact hole, and the pixel driver 70 may receive the signal from the signal line 80.

Figure 8:
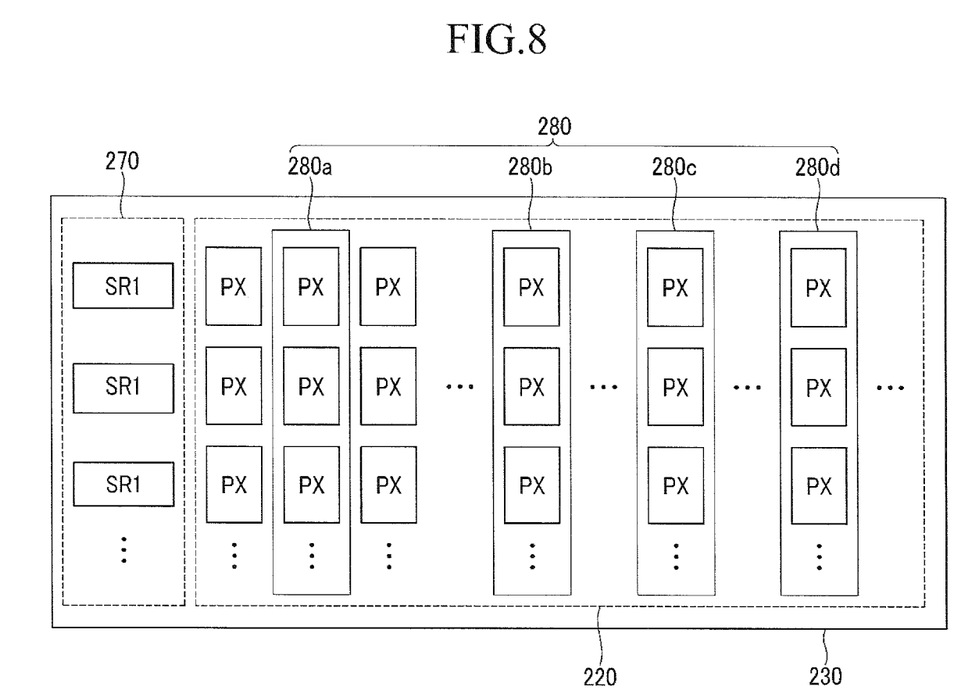
FIG. 8 is a block diagram illustrating a display panel according to an exemplary embodiment of the present invention.

FIG. 8 is a block diagram illustrating a display panel according to an exemplary embodiment of the present invention.

A display panel according to an exemplary embodiment of the present invention includes a plurality of pixels PX for displaying images, a pixel driver 270 for driving the plurality of pixels, and a plurality of signal lines 280 for transferring signals to the pixel driver 270, as illustrated in FIG. 8.

The display panel includes a display area 220 and a non-display area 230.

The pixels PX are positioned in the display area 220 and may be arranged in a matrix form including rows and columns.

The pixel driver 270 is positioned in the non-display area 230 and may include a plurality of stages SR1. As shown in FIG. 8, the plurality of stages SR1 are arranged at the left side of the display area 220 in a column direction in the non-display area 230. However, the embodiments of the present invention are not limited thereto, and the pixel driver 270 may be positioned at one or more of right, upper, and lower sides of the display area 220 and may be arranged in a row direction.

The pixel driver 270 may be a gate driver for supplying gate signals to the pixels PX or a data driver for supplying data signals.

The pixels PX and the pixel driver 270 may be formed of at least one thin film, and the thin film of the pixel PX and the thin film of the pixel driver 270 may be made in the same manufacturing process.

The signal lines 280 are positioned in the display area 220 and receive various signals, such as, for example, a low voltage VSS, clock signals CK and CKB, or a scan starting signal STV from the outside and transfer the received signals to the pixel driver 270. Additional lines for connecting the signal lines 280 with the pixel driver 270 may be formed.

The signal lines 280 may be formed in the display area 220 and each of the signal lines 280 may overlap a column of pixels PX. The signal lines 280 may include a first signal line 280*a*, a second signal line 280*b*, a third signal line 280*c*, and a fourth signal line 280*d*. The first, second, third, and fourth signal lines 280*a*, 280*b*, 280*c*, and 280*d* respectively may overlap different columns of the pixels PX.

The plurality of signal lines 280 may be spaced apart from each other at a predetermined interval. For example, the first signal line 280*a* is positioned at the leftmost side, and the second, third, and fourth signal lines 280*b*, 280*c*, and 280*d* may be disposed in sequence at the right of the first signal line 280*a*. An interval between the first signal line 280*a* and the second signal line 280*b*, an interval between the second signal line 280*b* and the third signal line 280*c*, and an interval between the third signal line 280*c* and the fourth signal line 280d may be the same or substantially the same as each other. When the signal lines 280 are formed of an opaque metal layer, areas where the signal lines 280 are formed may appear dark. The signal lines 280 are uniformly divided and distributed in the entire display area 220, and thus, such areas may be prevented from being recognized. In other words, the dark portion may not be seen by a viewer.

As shown in FIG. 8, the signal lines 280 respectively overlap some corresponding columns of the pixels PX, but not all of the pixels PX.

In the display panel illustrated in FIG. 8, the signal lines 280 are formed in the display area 220, and thus, the non-display area 230 may be reduced. Further, the entirety or part of the pixel driver 270 may be formed in the display area 220, and thus, the non-display area 230 may be further reduced.

Figure 9:
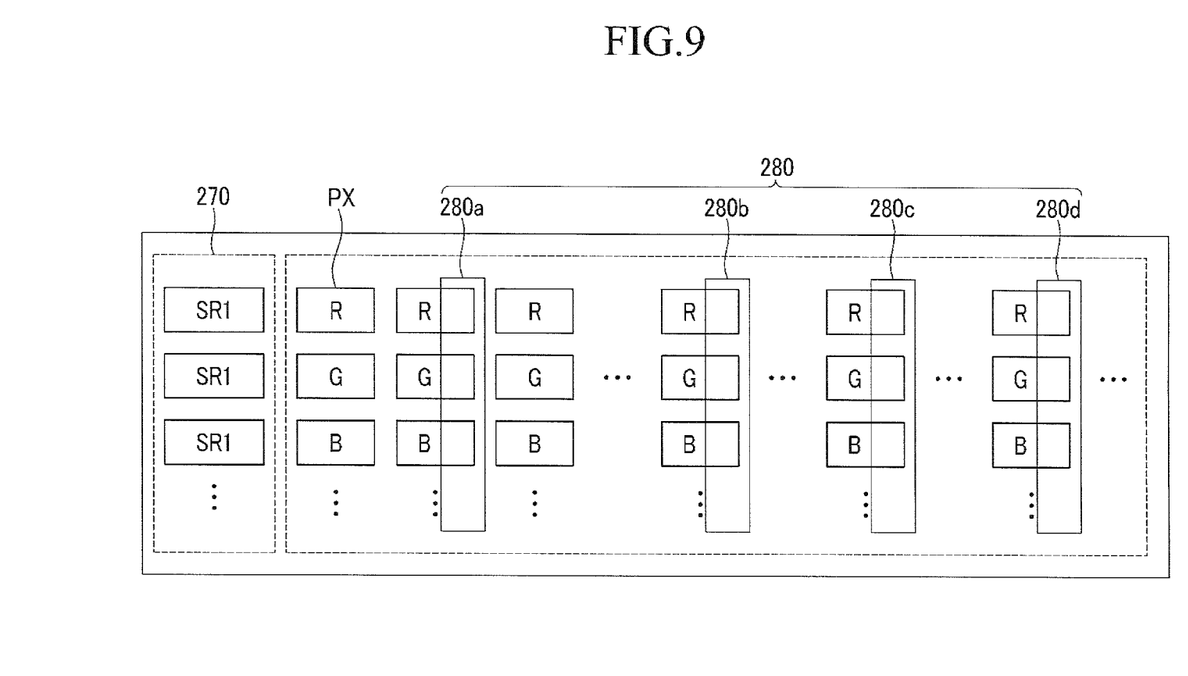
FIG. 9 is a block diagram illustrating a display panel according to an exemplary embodiment of the present invention.

FIG. 9 is a block diagram illustrating a display panel according to an exemplary embodiment of the present invention.

In FIG. 8, the vertical length of the pixels PX is larger than the horizontal length of the pixels PX. In FIG. 9, the horizontal length of the pixels PX is larger than the vertical length of the pixels PX.

In the display panel illustrated in FIG. 8, the horizontal width of the signal lines 280 may be larger than the horizontal width of the pixels PX. Thus, some columns of pixels PX are fully covered by the signal lines 280, thus resulting in an increase in a light blocking area. To reduce the light blocking area, the width of the signal lines 280 may be reduced. However, a decrease in the width of the signal lines 280 may result in an increase in resistance of the signal lines 280.

In the display panel illustrated in FIG. 9, the pixels PX are disposed rotating them at 90 degrees, and thus, the horizontal width of the signal lines 280 may be smaller than the horizontal width of the pixels PX. Thus, the pixels PX are partially covered by the signal lines 280, thus increasing display quality.

The pixels PX may represent various colors. For example, the pixels PX may include red pixels R, green pixels G, and blue pixels B. The red pixels R, the green pixels G, and the blue pixels B may be sequentially repeated in one column. Such arrangement may prevent only one color of pixels in one column of pixels from belonging to a dark area, thus resulting in an increase in display quality.

Colors of the pixels PX may include white, yellow, cyan, and magenta, in addition to red, green and blue.

Figure 10:
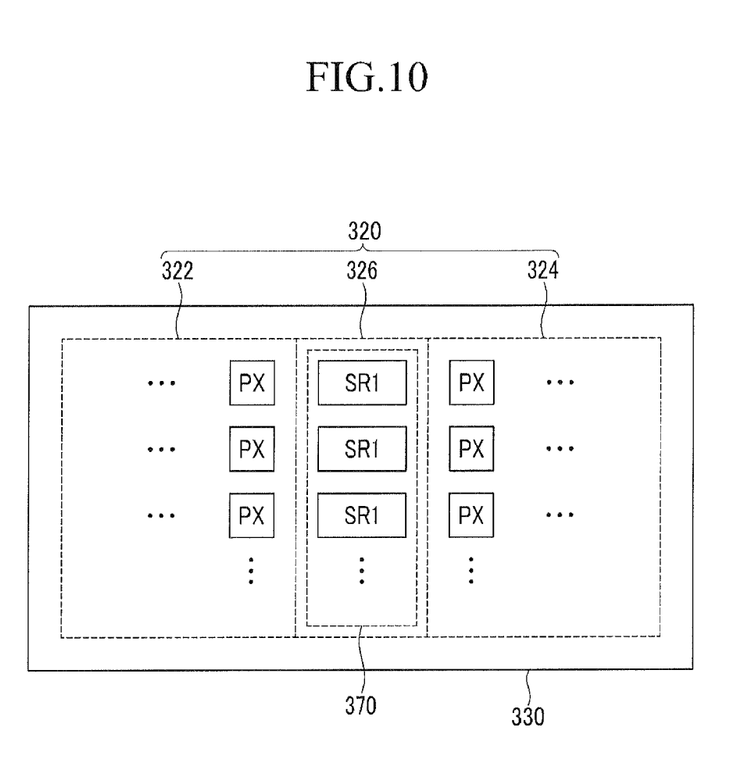
FIG. 10 is a block diagram illustrating a display panel according to an exemplary embodiment of the present invention.

FIG. 10 is a block diagram illustrating a display panel according to an exemplary embodiment of the present invention.

The display panel of FIG. 10 includes a plurality of pixels PX for displaying images and a pixel driver 370 for driving the plurality of pixels PX.

The display panel includes a display area 320 and a non-display area 330.

The display area 320 may include a first sub-display area 322 and a second sub-display area 324 which are separated from each other. The display area 320 may further include a light blocking area 326 positioned between the first sub-display area 322 and the second sub-display area 324. For example, the light blocking area 326 is positioned at the center of the display area 320, the first sub-display area 322 is positioned at the left side of the light blocking area 326, and the second sub-display area 324 may be positioned at the right side of the light blocking area 326.

The pixels PX are positioned in the display area 320, and particularly, in the first sub-display area 322 and the second sub-display area 324. The pixels PX may be arranged in a matrix form including rows and columns.

The pixel driver 370 is positioned in the display area 320. The pixel driver 370 may be positioned in the light blocking area 326 of the display area 320. The pixel driver 370 may include a plurality of stages SR1 which are arranged in a column direction in the light blocking area 326. However, the embodiments of the present invention are not limited thereto, and the pixel driver 370 may be arranged in a row direction in the light blocking area 326. In this case, the two sub-display areas may be disposed at the upper and lower sides of the light blocking area.

The horizontal width of each of the stages SR1 of the pixel driver 370 may be larger than the horizontal width of one pixel PX. The horizontal width of the light blocking area 326 may be larger than the horizontal width of one pixel PX.

The pixel driver 370 may be a gate driver for supplying gate signals to the pixels PX and a data driver for supplying data signals to the pixels PX.

The pixels PX and the pixel driver 370 may be formed of at least one thin film, and the thin film of the pixel PX and the thin film of the pixel driver 370 may be made in the same manufacturing process.

The pixel driver 370 in the display panel illustrated in FIG. 10 is formed in the display area 320, and thus, the non-display area 330 may be reduced.

A plurality of signal lines through which signals are transmitted to the pixel driver 370 may be formed in the light blocking area 326. The signal lines may overlap the pixel driver 370, and thus, the non-display area 330 may be further reduced.

As described above, the display area 320 includes the two sub-display areas 322 and 324 and the light blocking area 326 positioned between the sub-display areas 322 and 324. However, the embodiments of the present invention are not limited thereto. The display area 320 may include three or more sub-display areas and two or more light blocking areas positioned between the sub-display areas.

Figure 11:
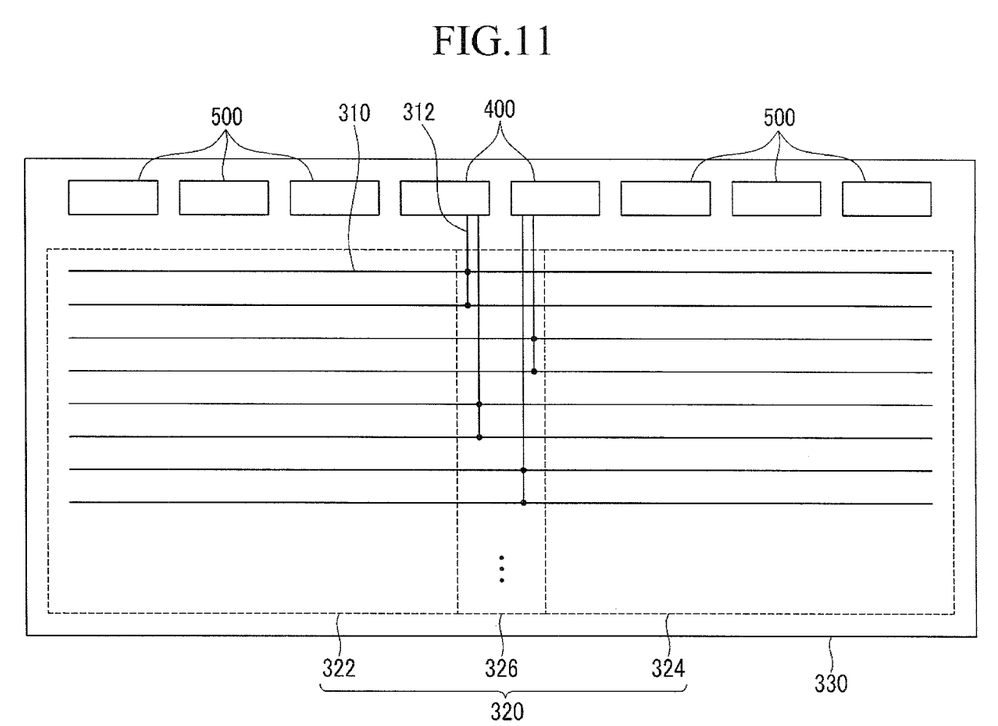
FIG. 11 is a block diagram illustrating a display panel according to an exemplary embodiment of the present invention.

FIG. 11 is a block diagram illustrating a display panel according to an exemplary embodiment of the present invention.

In FIG. 10, the pixel driver 370 is positioned in the light blocking area 326 of the display area 320. In FIG. 11, pixel drivers 400 and 500 are positioned in the non-display area 330.

The pixel drivers 400 and 500 may include a gate driver 400 and a data driver 500. For example, the pixel drivers 400 and 500 may be disposed at the upper side of the display area 320 in a row direction in the non-display area 330. The gate driver 400 is positioned at the center of the pixel drivers 400 and 500, and the data driver 500 may be disposed at two sides of the gate driver 400.

However, the embodiments of the present invention are not limited thereto, and the pixel drivers 400 and 500 may be disposed in a row direction or column direction in one or more of left, right, and lower sides of the non-display area 330. The data driver 500 may be positioned at the center of the pixel drivers 400 and 500, and the gate driver 400 may be disposed at two sides of the data driver 500.

The pixels may be positioned in the display area 320, e.g., in the first sub-display area 322 and the second sub-display area 324 of the display area 320.

Gate lines 310 for supplying gate signals to the pixels are formed in the display area 320. The gate lines 310 may be formed in a row direction in parallel to each other.

The gate lines 310 receive the gate signals from the gate driver 400. Connection lines 312 connect the gate lines 310 with the gate driver 400. Since the gate lines 310 are connected with the pixels, the connection lines 312 may transfer signals from the gate driver 400 to the pixels through the gate lines 310.

The connection lines 312 may be positioned in the light blocking area 326 or the non-display area 330. One connection line 312 may be connected with two gate lines 310, and in this case, the same signal is applied to the two gate lines 310. In this case, the number of the connection lines 312 is about a half of the number of the gate lines. To reduce the width of the light blocking area 326, three or more gate lines 310 may be connected to one connection line 312.

Figure 12:
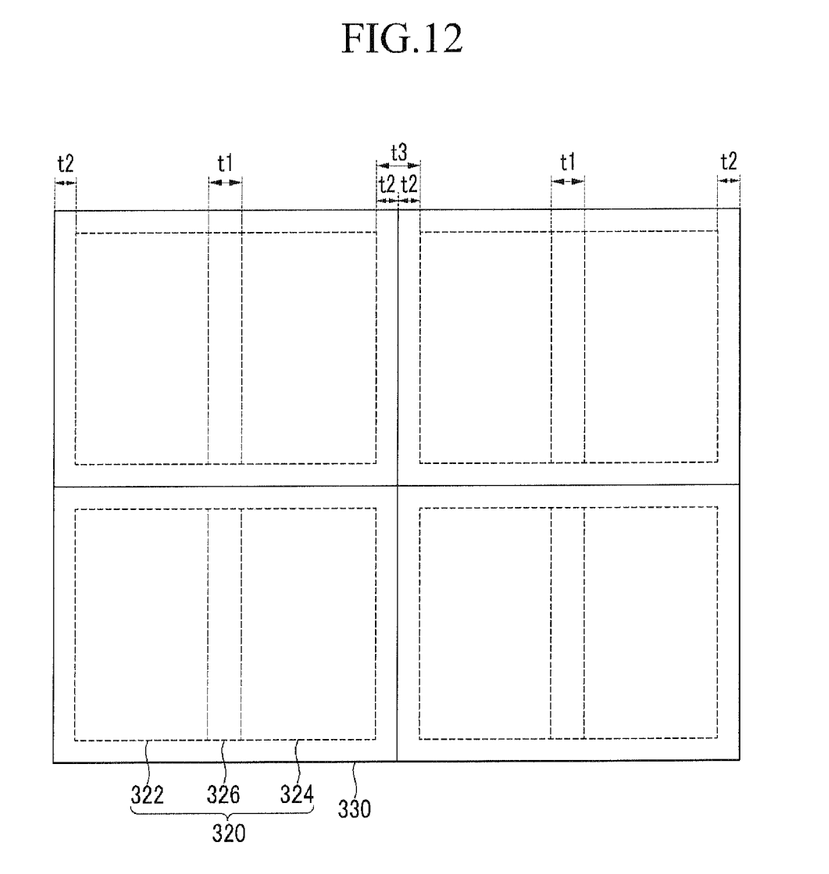
FIG. 12 is a diagram illustrating a multi-display according to an exemplary embodiment of the present invention.

FIG. 12 is a diagram illustrating a multi-display according to an exemplary embodiment of the present invention.

In FIGS. 10 and 11, the light blocking area 326 is formed at the center of the display area 320, and thus, the non-display area 330 may be decreased.

In FIG. 12, the width t1 of the light blocking area 326 may be about two times larger than the width t2 of the non-display area 330. In this case, since two non-display areas 330 are positioned between the two adjacent display areas 320, the width t3 of the two display areas 320 may be substantially the same as the width t1 of the light blocking area 326.

In the multi-display according to an exemplary embodiment of the present invention, four display panels may be disposed in a 2*2 matrix form. In this case, a user may recognize that the entire screen is divided into eight partial screens.

When the light blocking area 326 is formed not at the center of the display area 320 but at a part of the non-display area 330, the user may recognize that the entire screen is divided into four partial screens and may more clearly notice the separation between the four partial screens than is the case when the light blocking area 326 is positioned at the center of the display area 320 according to an embodiment of the present invention.

According to an exemplary embodiment of the present invention, a non-display area is reduced, and a bezel width is minimized, for example.

While this invention has been particularly shown and described in connection with exemplary embodiments thereof, it is to be understood by those of ordinary skill in the art that various changes in form and details may be made therein without departing from the spirit and scope of the invention as defined by the appended claims.

What is claimed is:

1. A display panel comprising:
a display area including a plurality of sub-display areas;
a non-display area;
a light blocking area positioned between the sub-display areas;
a plurality of pixels positioned in the sub-display areas;
a plurality of gate lines connected with the plurality of pixels;
a pixel driver connected with two or more of the plurality of pixels and configured to drive the connected pixels; and
a connection line connecting at least one of the gate lines with a gate driver of the pixel driver, wherein the pixel driver is disposed in the non-display area, and the connection line is disposed in the light blocking area,
wherein the pixel driver is disposed on an edge of the display panel, and
wherein the connection line extends in a direction crossing the at least one gate line connected to the connection line.

2. The display panel of claim 1, wherein a width of the light blocking area is about two times larger than a width of the non-display area.

3. The display panel of claim 1, wherein a width of the light blocking area is larger than a width of one of the pixels.

4. The display panel of claim 1, wherein the light blocking area is positioned at the center of the display area, and wherein the plurality of sub-display areas include a first sub-display area positioned at a first side of the light blocking area and a second sub-display area positioned at a second side of the light blocking area.

5. The display panel of claim 4, wherein at least one of the pixels includes
a switching unit connected with the pixel driver, wherein the switching unit is configured to turn on and off according to a signal from the pixel driver, and
a display unit connected with the switching unit, wherein the display unit is configured to display an image, and wherein
at least a part of the switching unit and at least a part of the pixel driver are formed of the same thin film, and wherein the pixel driver is formed in the light blocking area.

6. The display panel of claim 4, wherein the gate lines are formed in a first direction in the display area, and
wherein the connection line is connected with at least two of the gate lines.

* * * * *